United States Patent
Zwillinger et al.

(10) Patent No.: US 9,412,280 B1
(45) Date of Patent: Aug. 9, 2016

(54) COOPERATIVE SYSTEM AND METHOD FOR PRECISE AUTONOMOUS DELIVERY

(71) Applicants: Daniel Ian Zwillinger, Newton, MA (US); Ronald Douglas Hettich, Jr., Harvard, MA (US); John Cogliandro, Dedham, MA (US)

(72) Inventors: Daniel Ian Zwillinger, Newton, MA (US); Ronald Douglas Hettich, Jr., Harvard, MA (US); John Cogliandro, Dedham, MA (US)

( * ) Notice: Subject to any disclaimer, the term of this patent is extended or adjusted under 35 U.S.C. 154(b) by 0 days.

(21) Appl. No.: 14/934,025

(22) Filed: Nov. 5, 2015

(51) Int. Cl.
| | | |
|---|---|---|
| G08G 5/00 | (2006.01) | |
| G01C 23/00 | (2006.01) | |
| G01S 19/45 | (2010.01) | |
| G06Q 10/08 | (2012.01) | |

(52) U.S. Cl.
CPC .............. *G08G 5/0069* (2013.01); *G01C 23/00* (2013.01); *G01S 19/45* (2013.01); *G06Q 10/083* (2013.01)

(58) Field of Classification Search
CPC ...... G08G 5/0069; G01C 23/00; G01S 19/45; G06Q 10/083
See application file for complete search history.

(56) References Cited

U.S. PATENT DOCUMENTS

| | | | | |
|---|---|---|---|---|
| 6,670,911 B2 * | 12/2003 | Kishida | ................... | G01S 13/06 180/167 |
| 7,580,845 B2 * | 8/2009 | Burman | ................. | G06K 17/00 235/462.01 |
| 7,818,100 B2 * | 10/2010 | Goodman | ............. | B64C 25/426 244/111 |
| 2005/0038758 A1 * | 2/2005 | Hilbush | ........... | G06Q 10/06311 705/402 |
| 2011/0071954 A1 * | 3/2011 | McCall | .................. | G06Q 10/08 705/337 |
| 2011/0320377 A1 * | 12/2011 | Olsen, III | ............... | G06Q 10/08 705/339 |
| 2012/0095934 A1 * | 4/2012 | Klingenberg | .......... | G06Q 10/08 705/330 |
| 2013/0284800 A1 * | 10/2013 | Gillen | .................. | G06Q 10/083 235/375 |
| 2014/0180959 A1 * | 6/2014 | Gillen | ................ | G06Q 10/0838 705/341 |
| 2014/0330741 A1 * | 11/2014 | Bialynicka-Birula | | G06Q 10/0838 705/341 |
| 2015/0026089 A1 * | 1/2015 | Spiegel | ................ | G06Q 10/083 705/330 |
| 2015/0186842 A1 * | 7/2015 | Daniarov | ........... | G06Q 10/0838 705/341 |
| 2015/0199853 A1 * | 7/2015 | Bentley | ............ | G07B 17/00661 382/101 |
| 2015/0242811 A1 * | 8/2015 | Gillen | ................ | G06Q 10/0838 705/338 |
| 2015/0317597 A1 * | 11/2015 | Shucker | ............. | G06Q 10/0833 235/375 |
| 2015/0379465 A1 * | 12/2015 | Wada | ..................... | G06Q 10/06 235/376 |
| 2016/0042319 A1 * | 2/2016 | Mauch | ............... | G06Q 10/0838 705/341 |
| 2016/0094965 A1 * | 3/2016 | Sennett | ................... | H04W 4/22 455/404.1 |
| 2016/0117490 A1 * | 4/2016 | Daly | ....................... | G06F 21/45 726/19 |
| 2016/0127945 A1 * | 5/2016 | Cui | .................. | H04W 28/0247 370/329 |

* cited by examiner

Primary Examiner — Tuan C. To (57) ABSTRACT

A system for delivery of payload at a precise location by autonomous delivery vehicle. A machine-readable unique identifier is laid at a place where a user wants delivery of an item. User opens a precise delivery app on smartphone, activates the scanner and standing near the unique identifier scans it. Precise delivery app reads the unique identity of the unique identifier and collects the geophysical location of the smartphone. Third party system feeds this information of the target unique identifier to the autonomous vehicle. The autonomous delivery vehicle includes a first prior art navigator and a second scanner navigator. The autonomous vehicle determines its route to the approximate location of the target unique identifier with the help of the first prior art navigator and the second scanner navigator scans every unique identifier that may be present around that location and guides the autonomous vehicle to the target unique identifier.

24 Claims, 9 Drawing Sheets

COOPERATIVE SYSTEM AND METHOD FOR PRECISE AUTONOMOUS DELIVERY

FIELD OF THE INVENTION

The present invention in general is related to autonomous delivery systems and methods. More specifically, the present invention is related to the use of inexpensive cooperative navigation systems and methods for delivery of packages via unmanned aerial vehicles at a precise desired delivery location.

BACKGROUND OF THE INVENTION

Online or remote shopping has grown immensely over the past decade. Remote shopping offers many benefits including allowing customers to shop from literally anywhere in the world, eliminating the costs associated of having to ship, store, and sell items from traditional retail store locations, and allowing manufacturers and distributors to reach a larger target market at a lower cost and higher margin than by traditional retail locations.

However, despite these advantages, remote shopping has some drawbacks and, among such drawbacks, the lag time between purchasing an item and having it delivered is a major one. Most of the goods purchased by remote shopping need to be delivered to the users at home or at business place and this can take days or longer. Companies are attempting to minimize the delay between purchase and delivery by offering same day delivery in certain cities. However, this can be very costly and inefficient as it requires a large number of individuals on call to go out and deliver items as they are purchased.

One of the emerging methods in improved delivery service that does not have the draw backs of conventional delivery, is the use of unmanned aerial vehicles/drones. Drones can be used to carry and deliver small to medium sized packages, directly to known locations, using global positioning system technology, telemetry, metadata and/or commands from a remote operator. Once purchased, these drones promise to be much more cost effective than human delivery via foot, bike, truck, etc., and will likely be faster as they can bypass traffic and are not limited to following paved roads.

As consumer demand for same day delivery rises, drones will rapidly become a viable technology for many delivery services and companies. However, despite its many advantages, one of the potential problems of using drones to deliver packages is its failure to deliver at a customer controlled address. In a typical urban residential/commercial area, any two customers can have desired delivery locations very close to each other. In certain situations, a specific desired receiving area maybe adjacent to other potential receiving areas, perhaps separated by less than a meter, and drones or other autonomous vehicles may fail to deliver packages accurately at such delivery addresses. The problem with the present day Global Positioning System (GPS) based drone delivery system is that commercially used GPS systems can neither offer the high degree of accuracy that would be required for precise landing of a drone at a delivery address, nor does it provide differentiation between parties at the same address, nor does it provide feedback to the deliverer. Likewise the current coordinate-based delivery systems cannot account for safety and obstruction issues. Even in an area that is easily located via GPS there may be preferred areas within that address that should be avoided for safety or obstacle reasons, such as a children's play area or telephone wires.

On the other hand, the high accuracy navigation systems are very expensive, consume a lot of power and size and, thus, are a hurdle in implementing those systems in commercial utilization of autonomous package delivery system. There are available some other systems and methods for autonomous delivery vehicle navigation which do not require very high initial investment. But such systems need electric power and proper maintenance. For example, some landing zone indicators use electric lights to indicate their location. These indicators consume high amount of electricity and are often accompanied by dedicated generators. Hence, this won't be appropriate for a consumer who does not want to actively maintain his landing zone, or supply it with power. Some landing zone indicators use lasers which also consume much power. This also won't be appropriate for consumers who do not want to actively maintain their landing zone, or supply it with power.

Many delivery services will soon begin adopting the new form of delivery; that is, delivery through autonomous vehicles. But, to revolutionize the autonomous delivery service, it is imperative that the proper infrastructure is developed which enables successful implementation of drone delivery or delivery by other autonomous vehicles. What is needed is a system and method for delivering payloads to a specific location with high accuracy through an inexpensive and easy to use navigation system.

OBJECTS OF THE INVENTION

It is, therefore, an object of the present invention to provide a system and method for high accuracy delivery of payloads at desired locations by autonomous delivery vehicles through inexpensive and easy to implement navigation system.

Another object of the present invention is to provide a system and method for delivering payloads to a specific location with high accuracy by cooperation between the payload delivery system and the delivery location.

Yet another object of the present invention is to provide a system and method for delivering payloads at a landing zone wherein the landing zone require no power to announce its position.

Still another object of the present invention is to provide a system and method for precise delivery of payloads at a target landing zone wherein the target landing zone requires no maintenance.

A further object of the present invention is to provide a central database to store GPS location, unique identity of landing zone and unique user code for facilitating fast and easy communication of information for precise delivery of payloads to a specific location.

A still further object of the present invention is to provide a system and method for delivering payloads to a specific location which works for several types of delivery vehicles like drones and other autonomous vehicles.

Yet another object of the present invention is to provide a system and method for precise delivery of payloads at a target landing zone as desired by a customer among a plurality of landing zones associated with other customers and located in close proximity to the target landing zone.

Another object of the present invention is to provide a feedback system and method for confirming delivery of a payload at a desired location by an autonomous delivery vehicle.

Details of the foregoing objects and of the invention, as well as additional objects, features and advantages of the invention will become apparent to those skilled in the art upon consideration of the following detailed description of the preferred embodiments exemplifying the best mode of carrying out the invention as presently perceived.

SUMMARY OF THE INVENTION

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The present invention is directed to a system and method for safe and effective delivery of a payload at a precise location by autonomous delivery vehicles. A machine-readable unique identifier, such as a barcode, optionally affixed to a substrate is laid at a place (e.g., top of a building or backyard, driveway or any other place where an autonomous vehicle can deliver) where a user wants delivery of a consignment. In the most basic embodiment the recipient prints out a unique barcode for display at the landing zone. In another embodiment, the user (recipient) can print out a unique identifier on a common home computer printer and then download and install a mobile app, hereinafter referred to as precise delivery app, on a mobile computing device such as a smartphone from a precise delivery system server through a network. Once the unique identifier is placed, the user can open the precise delivery app, activate the smartphone camera or scanner and, standing near the unique identifier, scan the unique identifier. The precise delivery app reads the unique identity of the unique identifier and also collects the GPS location or geophysical location of the smartphone or the location where the unique identifier is placed. The GPS location of the smartphone or the geophysical location of the user determined delivery address can be considered as the approximate location of the unique identifier. The unique identifier information, which includes the unique identity of the unique identifier and the geophysical location of the unique identifier, can be sent to the precise delivery system server where this information gets stored. In some embodiments, for each user registered with the precise delivery system server, the precise delivery system server generates a user code and the unique identifier information is stored associated with this user code corresponding to each user ID or user code. In another embodiment the unique identifier is pre-associated with data referring to the contents of the delivery which the drone or drone controller checks for accuracy prior to final release of the payload.

If the user needs delivery of an item from a third party at the place where he/she has positioned the unique identifier, he/she can send the unique identifier information to the third party system directly or the user can send only his/her user code to the third party system and the third party system will be able to retrieve the unique identifier information from the precise delivery system server based on the user code. The third party system can feed the unique identifier information of the target unique identifier; that is, the unique identifier where the user is requesting delivery of a payload by an autonomous delivery vehicle. In accordance with an embodiment of the present invention the autonomous delivery vehicle includes a navigation system comprising a first prior art navigator and a second scanner navigator. The autonomous vehicle, carrying a payload, determines its route to the approximate location of the target unique identifier with the help of the first prior art navigator. Once the autonomous delivery vehicle reaches the approximate geophysical location of the target unique identifier, the second scanner navigator scans each and every unique identifier that may be present around that location to locate the unique identifier that matches the unique identifier of the target unique identifier as fed by the third party to the autonomous delivery vehicle. If the autonomous delivery vehicle succeeds in locating the target unique identifier the second scanner navigator system, optionally in coordination with the first prior art system, guides the autonomous delivery vehicle to the target unique identifier where the delivery of the payload can be made.

The system and method of the present invention offers an inexpensive solution for a highly accurate autonomous delivery of a payload at locations desired by a user and the system and method can be adopted for implementation at a large scale commercial use.

To the accomplishment of the foregoing and related ends, certain illustrative aspects of the disclosed invention are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

In order to describe the manner in which features and other aspects of the present disclosure can be obtained, a more particular description of certain subject matter will be rendered by reference to specific embodiments that are illustrated in the appended drawings. Understanding that these drawings depict only typical embodiments and are not therefore to be considered to be limiting in scope, nor drawn to scale for all embodiments, various embodiments will be described and explained with additional specificity and detail through the use of the accompanying drawings in which.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
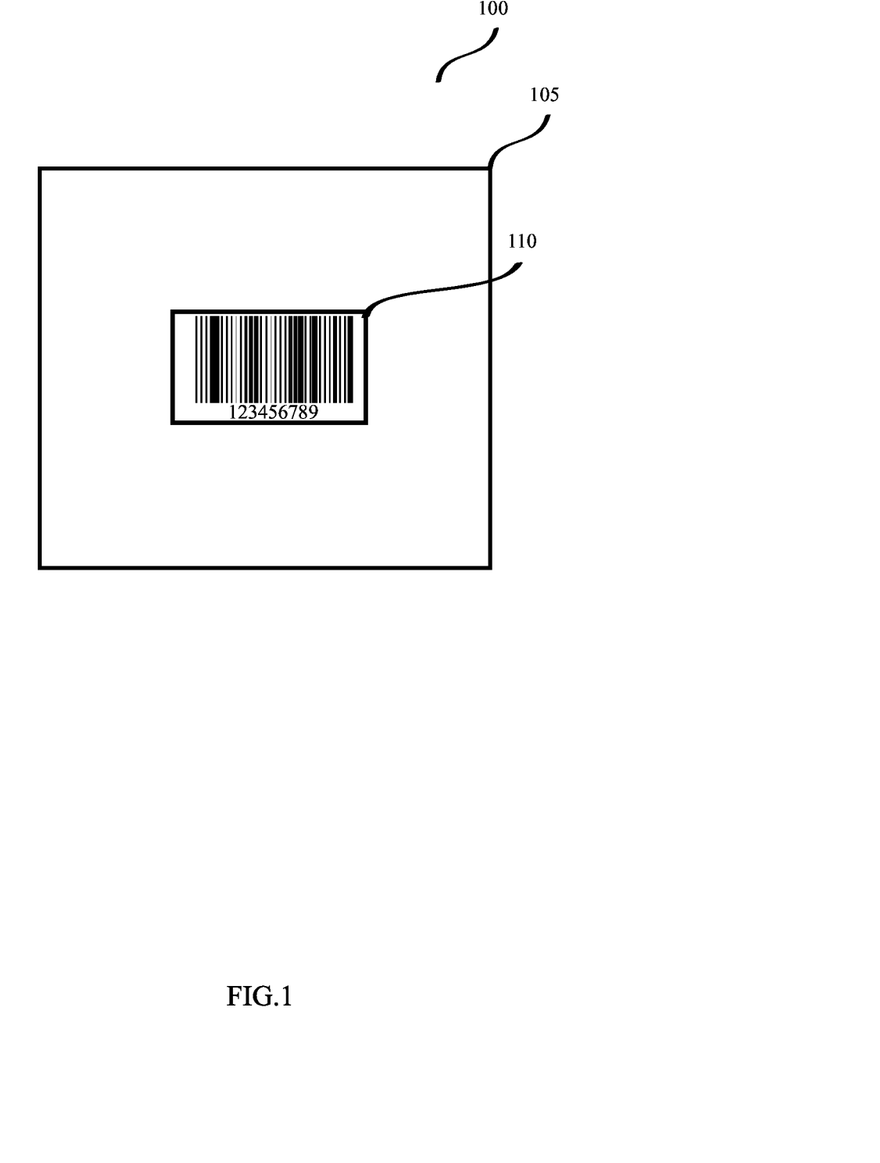
FIG. 1 illustrates a unique identifier in accordance with an embodiment of the present invention.

In an embodiment of the present invention, a unique identifier can be assigned to or associated with a particular user which, when detected by an unmanned aerial delivery vehicle such as drones or by any other aerial/ground autonomous delivery vehicle, can be used to precisely locate a delivery location desired by the user when the drone comes within a certain distance of the location of the unique identifier. The unique identifier is machine-readable and may be recognizable in any of the frequencies which lie within the electromagnetic spectrum including radio frequency, light, heat, etc. For example, in a preferred embodiment, the unique identifier can be an optical machine-readable code lying in the visible range, such as a barcode 110 as shown in FIG. 1, to which a user specific data can be associated with. Similarly, the unique identifier may be a code lying in the ultra violet frequency range recognizable by an ultra violet scanner or it may be a code lying in the infra red frequency range recognizable by infrared scanners or it may be a code recognizable by a vibration scanner. The unique identifier, such as the barcode, can be a factory printed one or it can be generated by a user at home using any commonly known barcode generation device such as a home computer and printer or by using any common manufacturing methods. Since, for implementation of the method of the present invention, the unique identifier will be mostly required to remain at the outdoors and also since the material on which the unique identifier is printed on is likely to be a thin material (e.g., a piece of paper), such thin material having the unique identifier can be attached to a comparatively heavier, long lasting, weather resistant substrate. In a preferred embodiment, the piece of material with the unique identifier 110 is attached to a piece of substrate 105. The substrate 105 can be of any suitable material, color, size and dimension. For example, the substrate 105 can be of square size with two feet each side and the material can be a piece of blue color tarpaulin. In some embodiments, the substrate 105 can be provided with a pocket to accommodate material containing the unique identifier. In such embodiments, a piece of paper with the unique identifier print can be inserted by a user into the weather proof pocket of the substrate and the user will have the liberty to replace the unique identifier as and when needed while keeping the substrate unchanged. In some embodiments, the unique identifier itself, without the use of any substrate, can be placed at a location where a delivery is desired. Again, in some other embodiments, a device (e.g. smartphone, tablet or any other similar device) with an electronic display can also be used to display the unique identifier. For example, a mobile phone or tablet can be placed at a desired delivery location with the unique identifier displayed at the display screen of the device. The term "substrate" is used herein to refer to any material or object to which the unique identifier may be affixed/attached to. Hereinafter, the term "unique identifier" will be used to refer to the unique identifier alone or to the combination of a unique identifier and a substrate.

In an alternate embodiment, the unique identifier can be in the form of a fixed or reprogrammable Radio-frequency identification (RFID) chip which is mailed to frequent users of the system. These dedicated unique identifiers may offer added convenience and reliability for frequent users and can be designed to receive and transmit the delivery data and location and can be changed on the fly for multiple locations.

Figure 3:
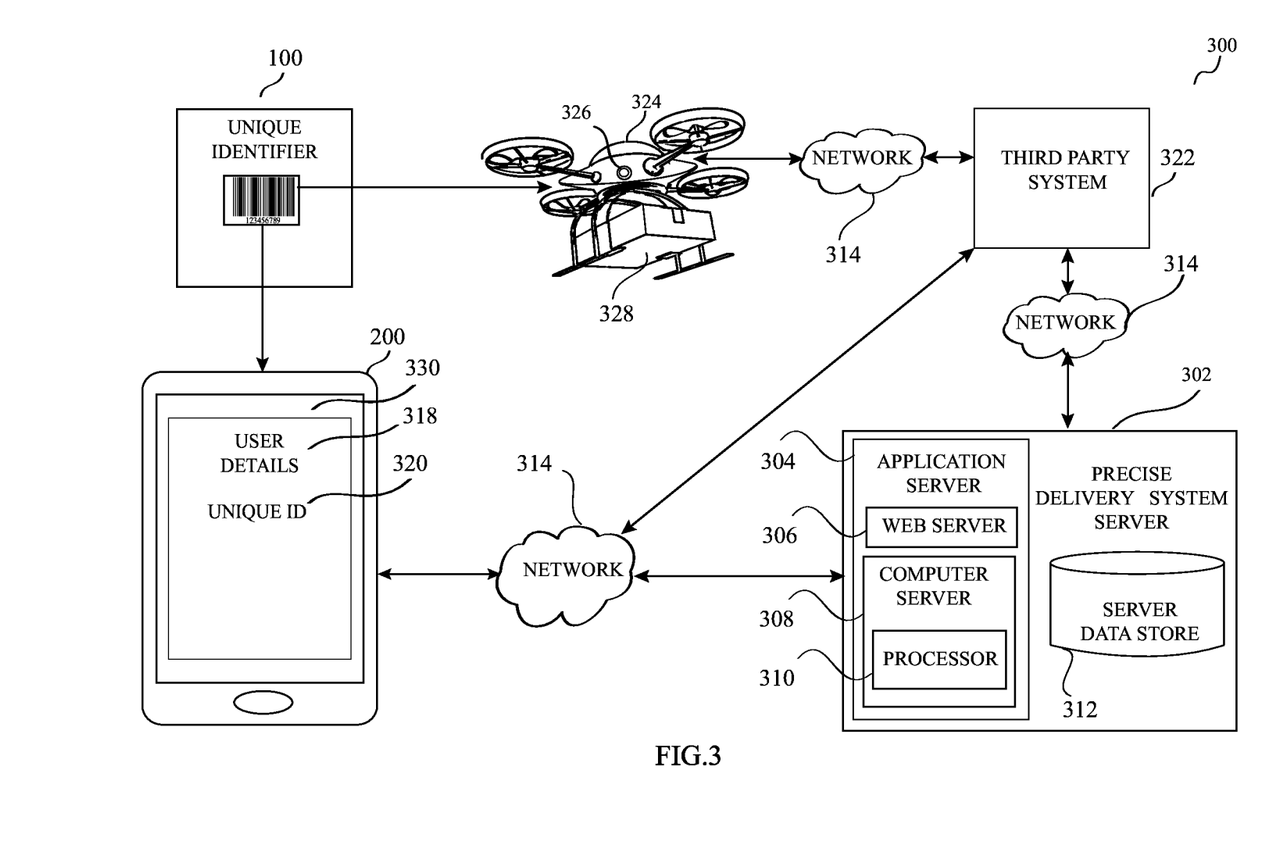
FIG. 3 illustrates a general architecture of a cooperative system for precise autonomous delivery that operates in accordance with an embodiment of the present invention.

FIG. 3 illustrates the general architecture of a cooperative precise delivery system 300 that operates in accordance with one embodiment of the present invention. A mobile computing device 200 is connected to a precise delivery system server 302 via a network 314. Although, only one mobile computing device 200 is illustrated in FIG. 3, it is to be understood that there can be a plurality of mobile computing devices 200 connected to the precise delivery system server 302. The precise delivery system server 302 communicates with the mobile computing device 200 over the network 314 to present a user interface for the cooperative precise delivery system of the present invention. The user interface of the cooperative precise delivery system of the present invention can be presented on the mobile computing device through a web browser or through a native mobile application communicating with the precise delivery system server 302 and is used for displaying, entering and/or managing data. As used herein, the term "network" generally refers to any collection of distinct networks working together to appear as a single network to a user. The term also refers to the so-called world wide "network of networks" or Internet which is connected to each other using the Internet protocol (IP) and other similar protocols. As described herein, the exemplary public network 314 of FIG. 3 is for descriptive purposes only and it may be wired or wireless. Although, the description may refer to terms commonly used in describing particular public networks such as the Internet, the description and concepts equally apply to other public and private computer networks, including systems having architectures dissimilar to that shown in FIG. 3. The inventive idea of the present invention is applicable for all existing cellular network topologies or respective communication standards, in particular GSM, UMTS/HSPA, LTE and future standards.

With respect to the present description, the precise delivery system server 302 may include any service that relies on a database system that is accessible over a network, in which various elements of hardware and software of the database system may be shared by one or more users of the system 300. The graphical user interface (GUI) or user interface provided by the precise delivery system server 302 on the mobile computing device 200 through a web browser or mobile app may be utilized by the users for signing up, logging in and submitting data, etc.

The components appearing in the precise delivery system server 302 refer to an exemplary combination of those components that would need to be assembled to create the infrastructure in order to provide the tools and services contemplated by the present invention.

The precise delivery system server 302 includes an application server or executing unit 304 and a data store 312. The application server or executing unit 304 comprises a web server 306 and a computer server 308 that serves as the application layer of the present invention. It would be obvious to any person skilled in the art that, although described herein as the data being stored in a single database, different separate databases can also store the various data and files of multiple users.

The Web server 306 is a system that sends out Web pages containing electronic data files in response to Hypertext Transfer Protocol (HTTP) requests from remote browsers (i.e. browsers installed in the mobile computing device 200) or in response to similar requests made through a mobile app or mobile application of the present invention installed on a mobile computing device 200. The web server 306 can communicate with the mobile app of the present invention and/or with a web browser installed on a mobile computing device 200 to provide the user interface required for the cooperative precise delivery system 300. The mobile computing device 200 comprise a first processor (not shown in the figures) and this first processor is configured to execute one or more instructions stored in a computer readable storage medium included in the mobile computing device 200.

Although, the description of the cooperative precise delivery system 300 may refer to terms commonly used in describing particular computer servers, the description and concepts equally apply to other processing systems, including systems having architectures dissimilar to that shown in FIG. 3.

The mobile application or "mobile app" is a computer program that may be downloaded and installed in mobile computing device 200 using methods known in the art. Hereinafter, the mobile app of the present invention is referred to as precise delivery app. The precise delivery app enables one or more persons to do various tasks related to the cooperative precise delivery system of the present invention. Examples of mobile computing device 200 may include, but not limited to mobile devices, tablets, hand-held or laptop devices, smart phones, personal digital assistants or any similar devices.

Figure 9A:
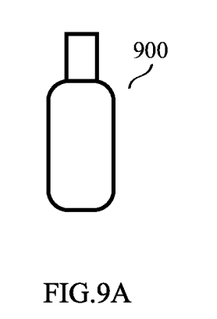
FIG. 9A illustrates an additional electronic device in accordance with an embodiment of the present invention.
Figure 9B:
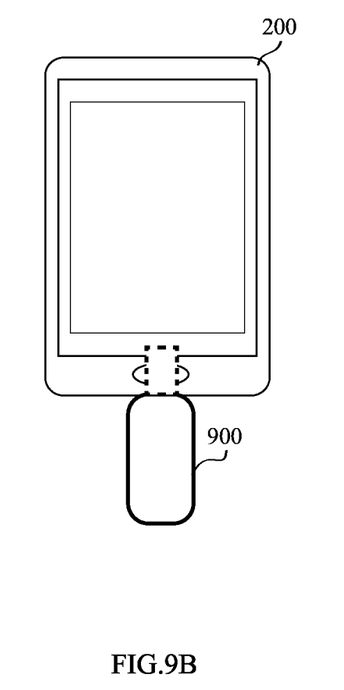
FIG. 9B illustrates the additional electronic device of FIG. 9A attached to a mobile computing device in accordance with an embodiment of the present invention.

The mobile computing device 200 may include various electronic components known in the art for this type of device. In this embodiment, the mobile computing device 200 may include a device display 330, a camera, a scanner, a geospatial location sensor (e.g., Global Positioning System-GPS sensor), a first processor, user input device (e.g., touch screen, keyboard and/or other form of input device known in the art), a device transceiver for communication, a computer readable device memory and the precise delivery app operably installed in the computer readable memory (not shown in figure). For purposes of this application, the term "transceiver" is defined to include any form of transmitter and/or receiver known in the art, for cellular, WIFI, radio, and/or other form of wireless or wired communication known in the art. Obviously, these elements may vary, or may include alternatives known in the art, and such alternative embodiments should be considered within the scope of the claimed invention. Optionally, the mobile computing device may be detachably fitted with an additional electronic device (e.g. a "dongle" or a small sensor) 900 as shown in FIG. 9A that plugs into one of the ports of the mobile computing device 200 as shown in FIG. 9B and interfaces with the software (e.g. with the mobile application of the present invention) using the device as the main computing power. This electronic device could provide additional capability of sensing/scanning and transmission not typical to a common mobile computing device. Examples of the additional capability of sensing/scanning and transmission include, but are not limited to, RF sensing or transmission, pattern transmission or recognition, heat convection or sensing, or other types of transmission and scanning. It is envisioned this type of device would be sent to regular or high volume users of the service provided by the present invention.

Reference to FIG. 3, third party system 322 represents computer system of any third party which is involved in the process of delivering consignment/payload to a specific location/address as desired by a user/customer. Examples of a third party may include, but are not limited to, an e-commerce company, a postal service, an emergency service, etc. As shown in FIG. 3, the third party system 322 is communicatively connected to the precise delivery system server 302 over the network 314.

FIG. 3 further illustrates an autonomous delivery vehicle 324. Although, in FIG. 3, a drone is referred to by numeral 324, it is to be understood that the term "autonomous delivery vehicle 324" is used herein to refer to any ground autonomous vehicle or aerial autonomous vehicle which is unmanned and is able to carry a consignment/payload for delivery at a location. The terms "autonomous delivery vehicle", "autonomous vehicle" and "drone" are used herein alternatively and interchangeably. In some embodiment, the autonomous delivery vehicle 324 can also remain in two-way communication with the third party system 322.

Figure 2:
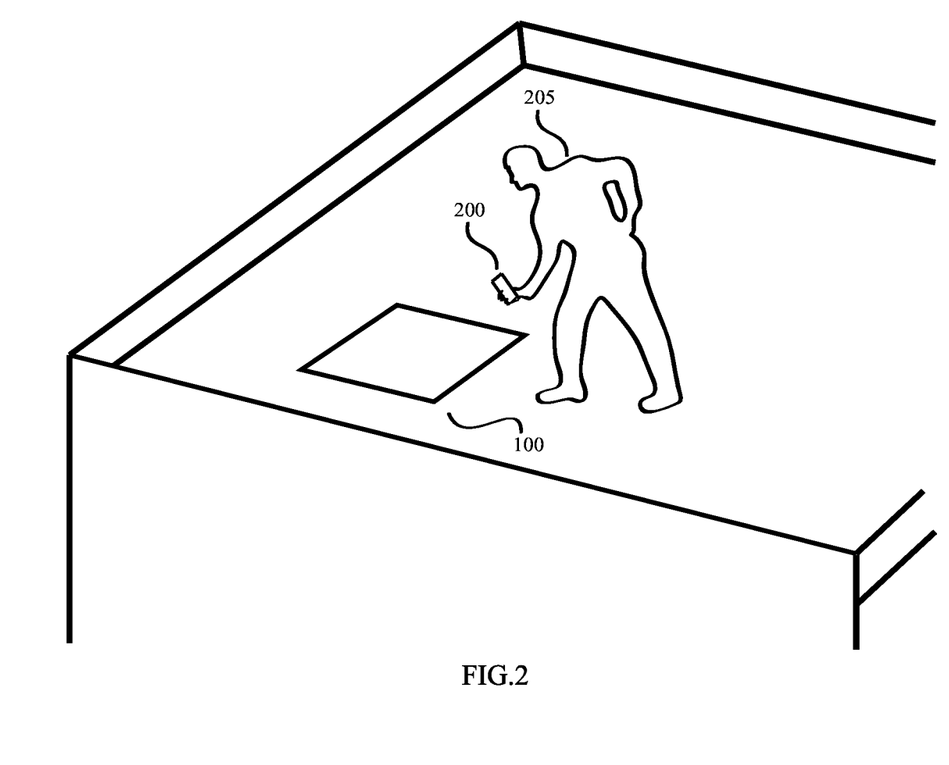
FIG. 2 illustrates a unique identifier placed on the roof of an apartment building in accordance with an embodiment of the present invention.

An embodiment of the present invention will be described by way of a non-limitative example and with reference to the accompanying drawings. A user 205 can get a unique identifier in various ways. For example, the user 205 may buy the unique identifier 100 from the market where the unique identifier may or may not be affixed to a substrate. In some embodiments, a user 205 may receive a unique identifier from the third party system 322 in printed form or in electronic form through email or text message etc. and the user 205 may, optionally, get the unique identifier affixed to a substrate or may put the unique identifier received in electronic form on display on an electronic display device (e.g. on the user's smartphone 200). Then, unique identifier 100 can be placed at a location where the user wants delivery of a payload. FIG. 2 illustrates a unique identifier 100 placed on the roof of an apartment building. In some embodiments, the unique identifier may further comprise information/data related to the contents of said payload/item to be delivered.

In FIG. 2 the user 205 is shown using a smartphone, which is a mobile computing device 200, with the precise delivery app installed on the smartphone 200. Reference to FIG. 2 and FIG. 3, in a preferred embodiment, the GUI provided by the precise delivery app on the device display 330 enables the user to enter user details 318, register/sign-up with the precise delivery system server 302, and then login as a registered user. For every registered user, the precise delivery system server generates a unique user code or user ID as in step 716 of FIG. 7 and the precise delivery app receives this user code on the mobile computing device 200 as in step 710 of FIG. 7.

Figure 7:
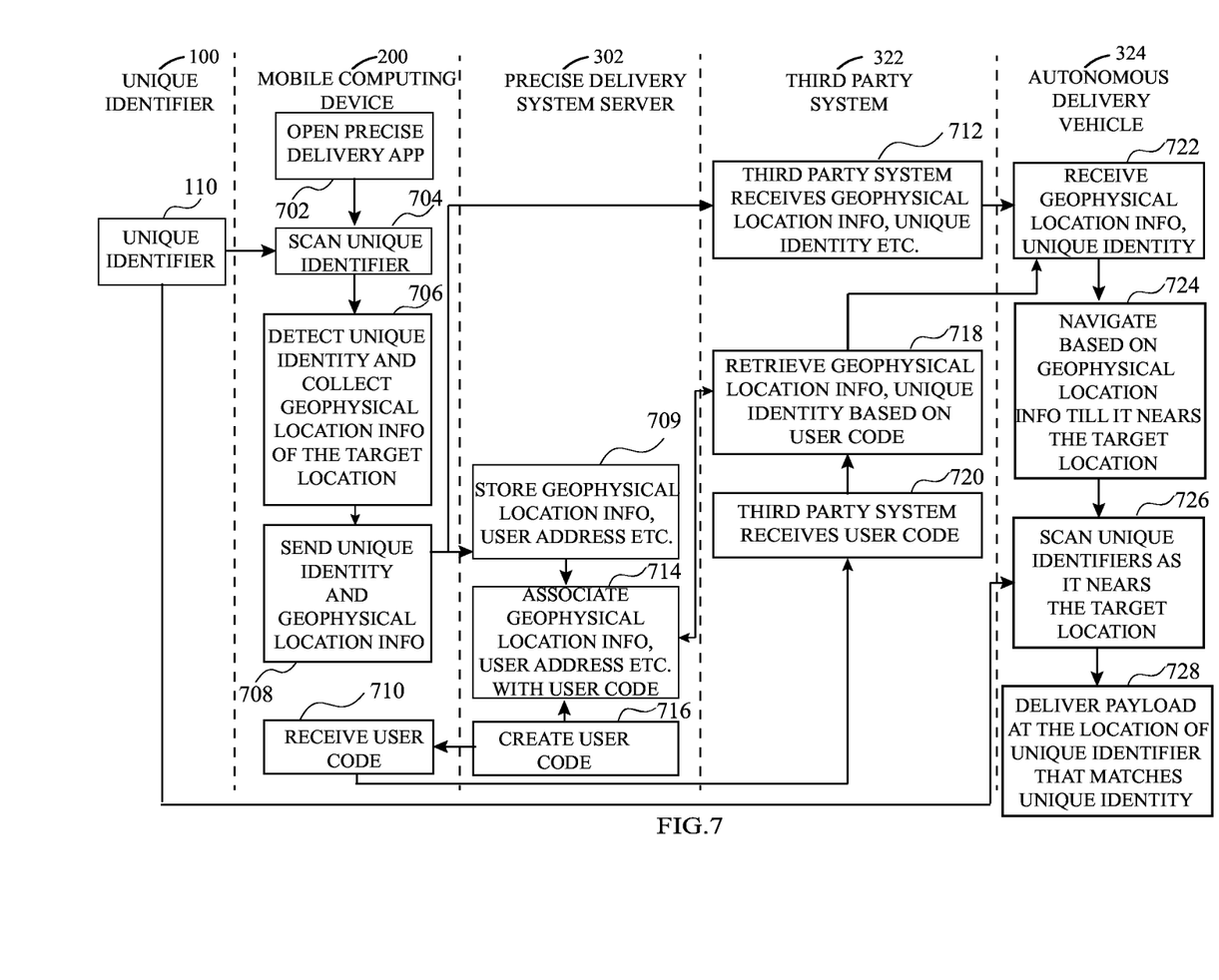
FIG. 7 illustrates a flowchart depicting the general steps associated with the method in accordance with an embodiment of the present invention.

Reference to FIG. 2, FIG. 3 and FIG. 7, in a preferred embodiment, the user 205 is required to stay near the unique identifier 100 and scan the unique identifier 100 with the help of the camera or scanner of the smartphone 200 as in step 704 of FIG. 7 keeping the precise delivery app on the smartphone 200 open as in step 702 of FIG. 7. With the help of the first processor available inside the smartphone 200, the precise delivery app decodes the unique identity of the unique identifier 100 as in step 706 of FIG. 7 and, optionally, displays the same on the device display 330. When the user 205 activates the precise delivery app, the app also gathers the geographical coordinate/GPS location data of the location where the smartphone 200 is at that moment through the GPS sensor of the smartphone 200. In a preferred embodiment, the precise delivery app associates the geographical coordinates of the location of the smartphone 200 with the unique identity 320 of the unique identifier 110 and instructs the first processor of the smartphone 200 to send these data to the precise delivery system server 302 over the network 314 as in step 708 of FIG. 7. In some embodiments, the geographical coordinate/GPS location data and the unique identity 320 may be sent separately to the precise delivery system server 302 and those may be associated with each other by the processor 310 at the precise delivery system server 302. Also, as in step 714 of FIG. 7, at the precise delivery system server 302, the user code created for a registered user is associated with the information such as GPS location, user address etc. sent from the smartphone 200. In some other embodiments, geophysical location information, which includes, preferably, but non-limitatively, the GPS location, user address etc., so associated with the unique identity, can be provided to the precise delivery system server 302 or to the third party system 322 in various other ways by the user. For example, the mailing address of the user can be provided to the third party system 322 directly while the user buys something from the third party system 322. The third party system 322 or the precise delivery system server 302 can use the user's Internet Protocol (IP) address to determine the physical location of the user when the user makes communication over the network. In some embodiments, when the user uses a mobile computing device such as smartphone 200, the cell tower associated with the user's mobile device can be used by the third party system 322 or the precise delivery system server 302 to get information on the physical location of the user. The GPS information, mailing address, cell tower defined address or any other specific information that can help in finding the approximate location of the unique identifier, where a user is requesting delivery of a consignment/payload, are hereinafter referred to, individually and/or collectively, by a term "geophysical location information".

In some embodiments the user 205 is allowed to send the unique identity and geophysical location information of the unique identifier 100 to the third party system 322 directly as in step 712 of FIG. 7 using the precise delivery app installed in the smartphone 200. To provide the information such as geophysical location information, unique identity of a unique identifier 100 and user details etc., the user can also opt to send his/her precise delivery system server generated user code to the third party system as in step 720 of FIG. 7. The precise delivery system server 302, as in step 714 of FIG. 7, associates the user code with geophysical location information and stores such information in the server data store 312. Based on this association, if a third party system 322 sends a user code to the precise delivery system server 302, the third party system 322 can retrieve the geophysical location information of the user as in step 718 of FIG. 7.

In some embodiments, the geophysical location information and other relevant information including information on the identity and content of the delivery of payload, name and mail address of the user etc. can be entered by a user 205 manually to a computing device such as home desktop computer or similar devices instead of using a mobile computing device. This information can then be sent to the third party system 322 and the third party system 322, in response, can generate a unique identifier in electronic form and send the unique identifier information in electronic form to the user 205. The user 205 can then take a print of the unique identifier information for display at a desired location.

Figure 4:
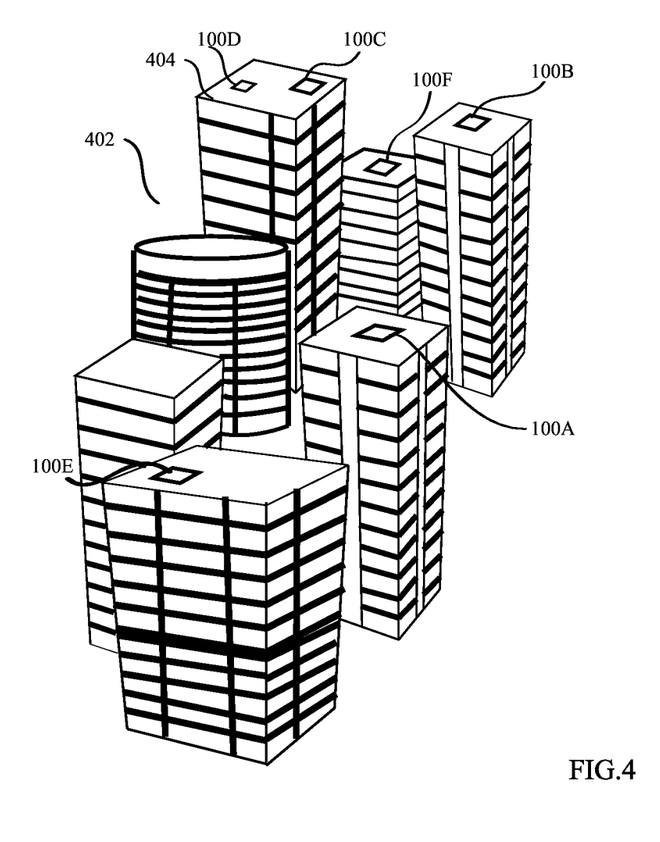
FIG. 4 illustrates an autonomous delivery vehicle approaching a cluster of residential buildings carrying a payload based on prior art navigation methods.
Figure 5:
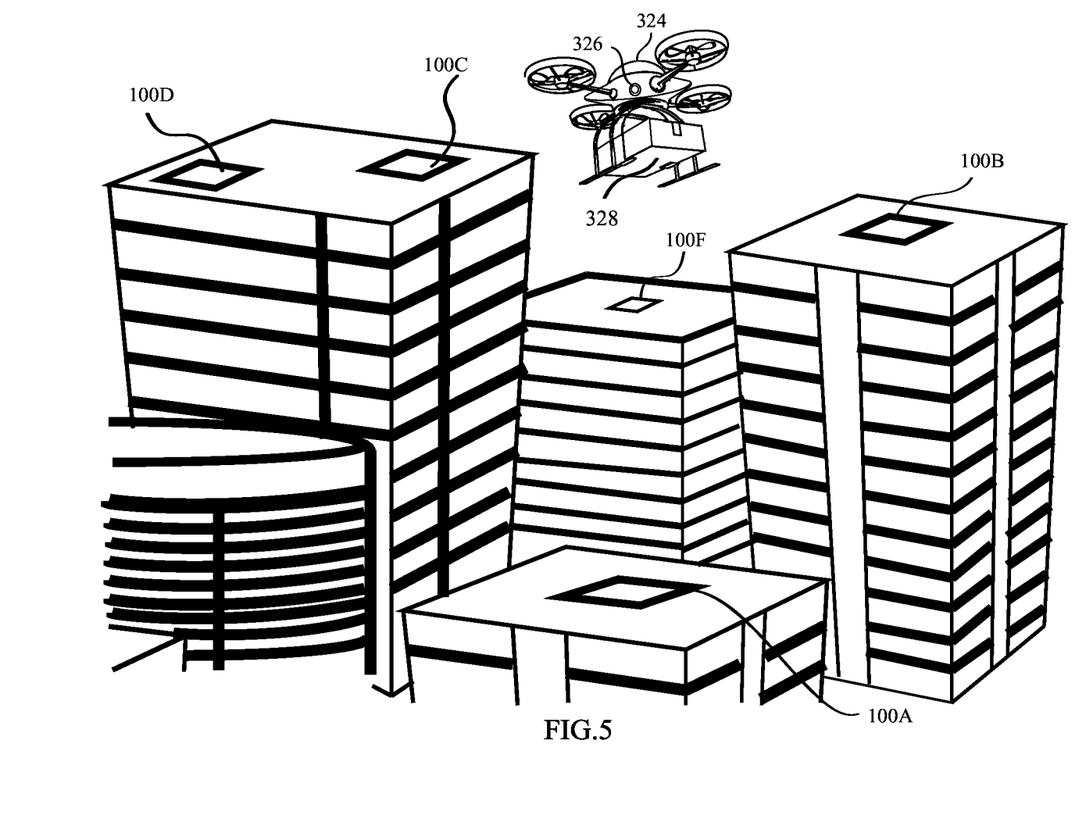
FIG. 5 illustrates an autonomous delivery vehicle electronically scanning and searching for the unique identifier for precise landing in accordance with an embodiment of the present invention, and optionally includes a data exchange mechanism, here the vehicle optically or electronically scans and searches for the unique identifier which includes data on location, payload, and other delivery information.
Figure 6:
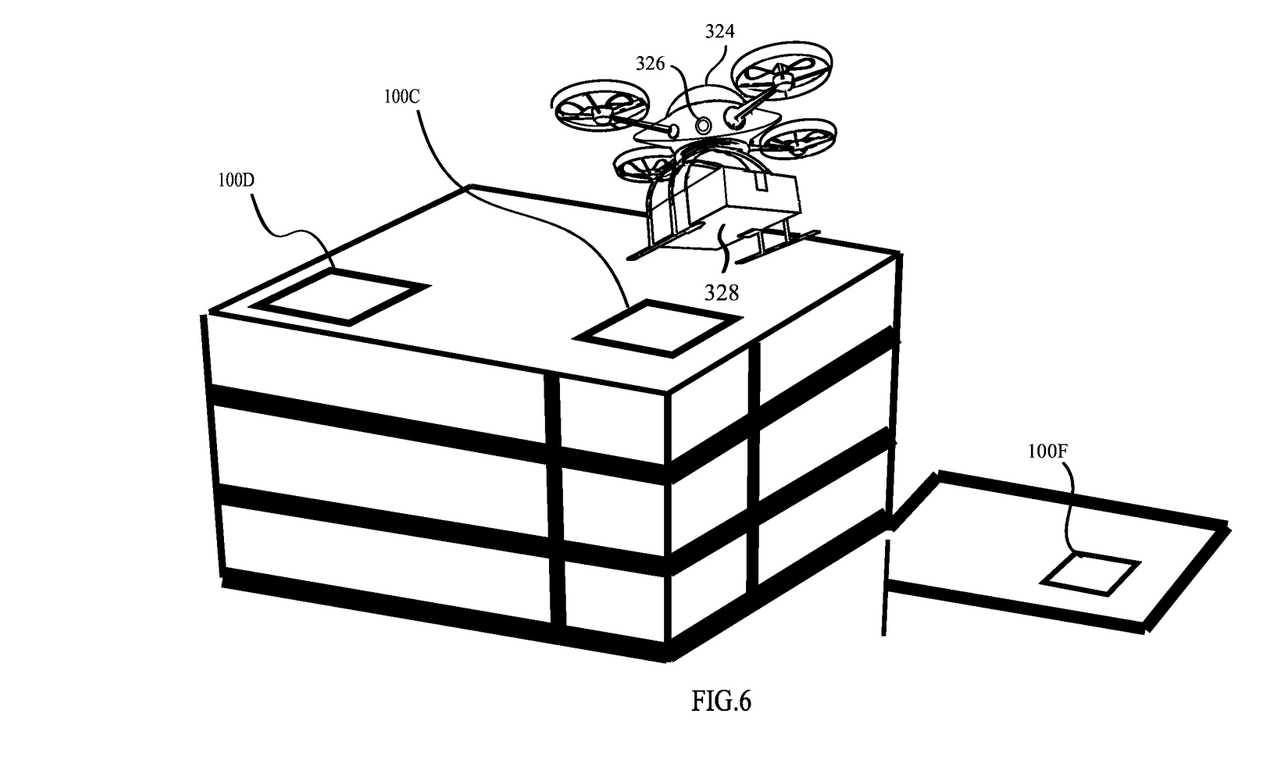
FIG. 6 illustrates an autonomous delivery vehicle landing on a target zone based on unique identity of the target location in accordance with an embodiment of the present invention.

For ease of explanation and clarity, the unique identifier 100 shown in FIG. 2 and FIG. 3 used by the user 205 is referred to as unique identifier 100C in FIG. 4, FIG. 5 and FIG. 6 in the present example. Similarly, a plurality of other unique identifiers 100 having different unique identities are referred to as unique identifier 100A, unique identifier 100B, unique identifier 100D, unique identifier 100E and unique identifier 100F etc.

In the present example, reference to FIG. 2 through FIG. 7, the user 205 buys an article online from an e-commerce website (e.g., eBay, Amazon) which will deliver the article at the buyer's place by using an autonomous delivery vehicle 324 (e.g., a drone 324). The server system of the e-commerce website from which the user 205 has bought the article is referred to as third party system 322 in the present example. The user 205 resides in a locality 402 which comprise a cluster of residential buildings. The user 205 places the unique identifier 100C at the top of the building 404 where there is placed another unique identifier 100D by a different user in close proximity (e.g., 2-3 meters away) to unique identifier 100C. At the top of some of the other nearby buildings there are unique identifiers 100A, 100B, 100E and 100F placed by other users of the precise delivery system of the present invention. Standing near the unique identifier 100C user 205 opens the precise delivery app in a mobile computing device 200 (e.g. a smartphone 200) as in step 702 of FIG. 7 and scans the unique identifier 100C with the camera or scanner available with the smartphone 200 as in step 704 of FIG. 7. As described above, the precise delivery app running in the smartphone 200 reads the unique identifier 100C as in step 706 of FIG. 7. The precise delivery app also collects the GPS location of the smartphone 200 as determined by the geospatial location sensor of the smartphone 200 and this GPS location also represents the approximate GPS location of the unique identifier 100C. The user 205 now has to communicate the unique identifier information which includes GPS location or the geophysical location information and unique identity of the unique identifier 100C so collected by the precise delivery app to the third party system 322. It is assumed that the user 205 is a registered user of the precise delivery system server 302 and that the user 205 has a user code or user ID generated by the precise delivery system server 302 for him/her as in step 716 of FIG. 7. The precise delivery app sends the unique identifier information of the unique identifier 100C to the precise delivery system server 302 as in step 708. At the precise delivery system server 302 all such information are stored in server data store 312 as in step 709 of FIG. 7. The precise delivery system server 302 also associates the user code of the user 205 with the geophysical location information and unique identity of the unique identifier 100C sent from the smartphone 200 of the user 205 as in step 714 of FIG. 7.

In one embodiment, the user 205 sends the unique identifier information which includes GPS location and unique identity of the unique identifier 100C to the third party system 322 directly from the smartphone 200 of the user 205 as in step 712 of FIG. 7. In another embodiment, the user 205 sends to the third party system 322 just his/her user code from the smartphone 200 as in step 720 of FIG. 7 and allows precise delivery system server 302 to share his/her stored details with the third party system 322 against receipt of any such request. The third party system 322 then sends the user code of user 205 to the precise delivery system server 302 and retrieves the required information such as geophysical location information and unique identity of unique identifier 100C as in step 718 of FIG. 7.

The third party system 322 feeds the geophysical location information and unique identity data of the target unique identifier 100C in the present example where the user 205 wants the payload to be delivered, to the autonomous delivery vehicle 324 as in step 722 of FIG. 7. In the present example, the third party system 322 uses a drone 324 which is an autonomous delivery vehicle and has an onboard navigation system which comprises a first prior art navigator (not shown in the figures) and a second scanner navigator 326 in accordance with an embodiment of the present invention. The scanning methods used by the second scanner navigator 326 to scan the unique identifiers includes, but are not limited to, optical scanning, ultra violet scanning, infra red scanning, vibration scanning. The target unique identifier information i.e. the geophysical location information and unique identity of the target unique identifier 100C, fed by the third party system 322, is kept stored by the navigation system of the drone 324 for determining the route to the desired landing location.

The drone 324, carrying the payload 328 (the article bought buy the user 205 in the present example) first navigates to the locality 402 guided by the first prior art navigator which uses commonly known navigation techniques such as dead reckoning navigation, compass navigation, visual landmark-based navigation, satellite navigation, radio navigation, as in step 724 of FIG. 7, to approach the approximate location of the unique identifier 100C as shown in FIG. 4. However, the prior art low cost navigation techniques used by the first prior art navigator would not be able to guide the drone 324 to the precise location of the unique identifier 100C where the user 205 desires delivery of the payload 328. Therefore, in accordance with an embodiment of the present invention, as shown in FIG. 5, once the drone 324 nears the approximate location of the unique identifier 100C (which is the area around the building 404 in the present example), the second scanner navigator 326 starts scanning the area around the target geophysical location which, in the present example, is the area around the geophysical location of the unique identifier 100C as in step 726 of FIG. 7. In a preferred embodiment, the second scanner navigator 326 may comprise a camera which is capable of zooming into a particular object of interest and, in some other embodiments, the optical navigator may include other optical scanning devices also. The processing unit of the onboard navigation system of the drone 324 continuously compares all the unique identities of the unique identifiers 100A, 100B, 100C, 100D, 100E and 100F etc., as in step 726 of FIG. 7, scanned by the second scanner navigator 326 to locate the unique identifier which matches the unique identity of the target unique identifier as fed by the third party system 322. In the present example the target unique identifier is unique identifier 100C and as soon as the second scanner navigator 326 identifies it by matching the unique identity of it with that stored in the memory of the navigation system of the drone 324, the second scanner navigator 326 continuously keeps track of the target unique identifier and navigates the drone 324 to the unique identifier 100C for landing and/or delivery of the payload 328 as in step 728 of FIG. 7. This cooperative navigation between the target unique identifier and the autonomous delivery vehicle makes it possible to deliver the payload 328 at the precise location where the user 205 wanted it to be.

Figure 8:
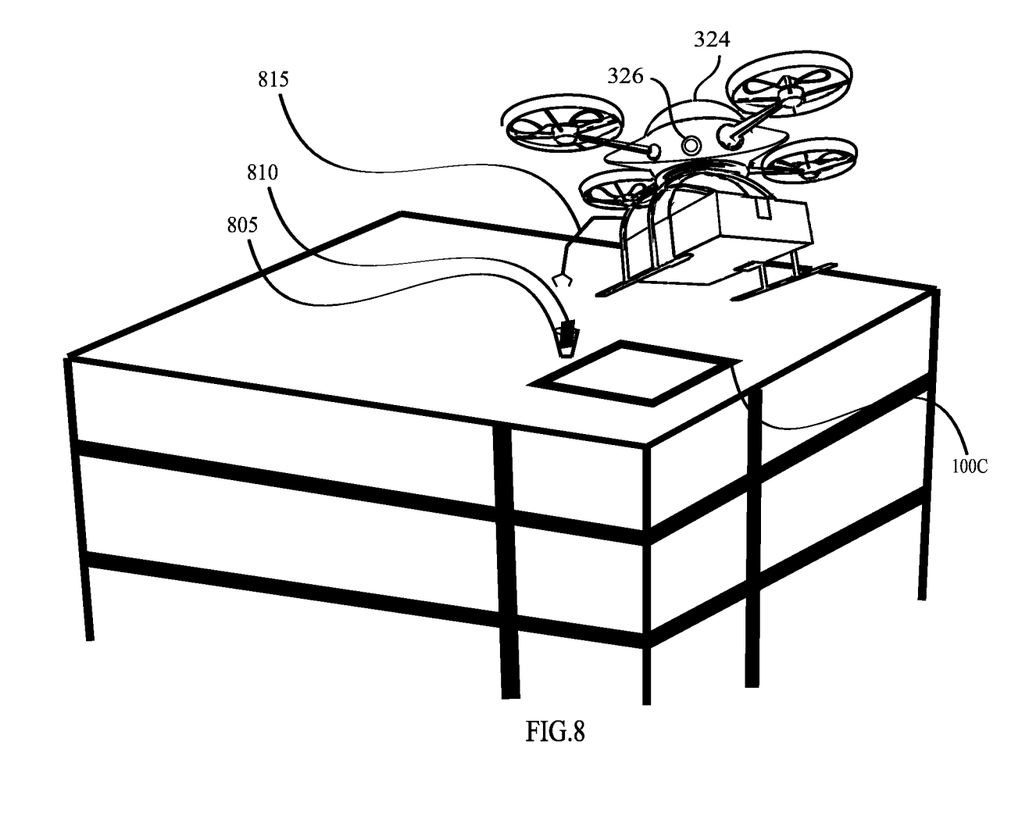
FIG. 8 illustrates an exemplary system of collecting an acknowledgement by an autonomous delivery vehicle in accordance with an embodiment of the present invention.

In some embodiments, the autonomous delivery vehicle 324 (i.e. the drone 324 in the present example) can receive an acknowledgement against successful delivery of the payload 328 at the desired location where the target unique identifier is positioned. The autonomous delivery vehicle 324 can receive this acknowledgement in various ways. For example, the unique identifier, apart from having the unique identity, geophysical location information and the payload details, may further comprise another electronic code. This electronic code may be made available with the unique identifier for scanning (optical scanning, IR scanning etc.) by the autonomous delivery vehicle 324 once the delivery of the payload is made at the unique identifier. Another way of acknowledging receipt of a payload at a desired location is to provide a receipt in a physical form (such as paper receipt or receipt printed on other similar materials) at the desired location which can be collected by the autonomous delivery vehicle once the payload is delivered. Reference to FIG. 8, the autonomous delivery vehicle 324 may collect the physical receipt 810 using a magnetic or friction device such as a robotic hand or hook 815. The physical receipt 810 can be contained in a custom container 805 for ease of pick up. In a preferred embodiment, the receipt (electronic or physical receipt) is not displayed until the payload is delivered, either by the recipient (user) manually or electronically displaying it after drop off of the payload, or automatically by a simple mechanism that uncovers or displays the receipt after the package touches down on a lever or a switch. This two way communication hand-shake could mark the receipt of the correct payload, a verification of receipt of high value goods and so on. It can also help differentiate between different deliveries to the same location, such as when a single family requests deliveries of two different items, or in an apartment building where multiple families order multiple items, but they have the same landing pad—effectively the same address.

The cooperative navigation provided by the system and method of the present invention through cooperation of the delivery location (by means of having the unique identifier) with the second scanner navigator 326 makes the delivery of payload by the autonomous delivery vehicle safer. In the prior art autonomous delivery systems the autonomous delivery vehicle may fail to navigate through obstructions which may come on its way to the destination delivery location. Also, due to inaccurate navigation, the autonomous vehicle may fail to travel to the exact desired location and, instead, may land at some distance away from the desired location making the situation unsafe. The cooperative navigation of the present invention helps in overcoming these problems as the autonomous delivery vehicle makes the delivery precisely at the desired location. So, if the unique identifier is positioned at a safe location, the cooperative navigation system and method of the present invention makes the delivery of payload by autonomous delivery vehicle safe. The term "safe location" is used herein to refer to places which can offer obstruction-free passage to an autonomous delivery vehicle and, also, which are not considered hazardous/dangerous to any living being or property if an autonomous vehicle travels to those places.

As explained above, the cooperative precise delivery system 300 of the present invention provides some distinct advantage over the commonly know autonomous delivery systems and methods. The unique identifiers having the unique identifiers can be mass produced, are inexpensive, need no external power, requires no or little maintenance but can still facilitate precise and safe delivery of a payload through autonomous delivery vehicles. Additionally, the present invention offers the flexibility of shifting the desired consignment delivery location as per user's wish depending upon the requirement.

Additionally, other variations are within the spirit of the present invention. For example, instead of using for delivery of a payload as described above, the system and method of the present invention can also be used for picking up of a payload or package by an autonomous vehicle from a specific location. In this embodiment, the autonomous vehicle will be able to find out the exact location from which a payload is to be picked up by locating the unique identifier laid at the desired place. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "affixed", "fitted" are to be construed as partly or wholly contained within, attached to, or joined together, even if there is something intervening. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

The flowchart is used to describe the steps of the present invention. While the various steps in the flowchart are presented and described sequentially, some or all of the steps may be executed in different orders, may be combined or omitted, and some or all of the steps may be executed in parallel. Further, in one or more of the embodiments of the invention, one or more of the steps described above may be omitted, repeated, and/or performed in a different order. In addition, additional steps, omitted in the flowcharts may be included in performing this method. Accordingly, the specific arrangement of steps shown in FIG. 7 should not be construed as limiting the scope of the invention Preferred embodiments of this invention are described herein. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for delivery of a payload by an autonomous delivery vehicle, said system comprising:
   a unique identifier having a unique identity, wherein said unique identifier is a target unique identifier placed at a location where delivery of said payload is desired by a user and said unique identifier is a machine readable code recognizable in any frequency that lies within a visible frequency range, an infrared frequency range or an ultra violet frequency range of an electromagnetic spectrum;
   a navigation system included in said autonomous delivery vehicle, said navigation system comprising a first prior art navigator and a second scanner navigator; and
   a third party system, said third party system providing a unique identifier information to said navigation system, said unique identifier information comprising said unique identity of said unique identifier and a geophysical location information of said location where delivery of said payload is desired by said user;
   wherein said first prior art navigator navigates said autonomous delivery vehicle to said location based on said geophysical location information and said second scanner navigator scans said location, locates said target unique identifier based on said unique identity and then navigates said autonomous delivery vehicle precisely to said unique identifier for delivery of said payload.

2. The system as in claim 1, wherein said second scanner navigator includes an optical scanner, an ultra violet scanner, a radio frequency scanner, and/or an infra red scanner.

3. The system as in claim 1, wherein said user uses a mobile computing device to scan said unique identity of said unique identifier and to send said unique identity to said third party system.

4. The system as in claim 3, wherein said mobile computing device is used to obtain said geophysical location information.

5. The system as in claim 1, wherein said unique identifier information is stored associated with a user code in a precise delivery system server.

6. The system as in claim 5, wherein said unique identifier information is retrieved by said third party system from said precise delivery system server by using said user code.

7. The system as in claim 1, wherein said second scanner navigator finds said target unique identifier based on said unique identity when said unique identity of said target unique identifier matches said unique identity included in said unique identifier information provided by said third party system to said navigation system.

8. A method for delivery of a payload by an autonomous delivery vehicle, said method comprising:
   placing of a unique identifier having a unique identity at a desired location, wherein said unique identifier is a target unique identifier placed at said desired location where delivery of said payload is desired by a user and said unique identifier is a machine readable code recognizable in any frequency that lies within a visible frequency range, an infrared frequency range or an ultra violet frequency range of an electromagnetic spectrum;
   providing a navigation system to said autonomous delivery vehicle, said navigation system comprising a first prior art navigator and a second scanner navigator; and
   providing a unique identifier information to said navigation system, said unique identifier information comprising said unique identity of said unique identifier and a geophysical location information of said desired location where delivery of said payload is desired by said user;
   wherein said first prior art navigator navigates said autonomous delivery vehicle to said desired location based on said geophysical location information and said second scanner navigator scans said desired location, locates said target unique identifier based on said unique identity and then navigates through a cooperative navigation said autonomous delivery vehicle precisely to said target unique identifier for delivery of said payload.

9. The method as in claim 8, wherein said unique identifier information is provided to said navigation system by a third party system.

10. The method as in claim 9, wherein said unique identifier information is provided to said third party system by a precise delivery system server.

11. The method as in claim 8, wherein said second scanner navigator includes an optical scanner, an ultra violet scanner, a vibration scanner, a radio frequency scanner, and/or an infra red scanner.

12. The method as in claim 9, wherein said user uses a mobile computing device to scan said unique identity of said unique identifier and to send said unique identity to said third party system.

13. The method as in claim 12, wherein said mobile computing device is used to obtain said geophysical location information.

14. The method as in claim 10, wherein said unique identifier information is stored associated with a user code in said precise delivery system server.

15. The method as in claim 8, wherein said unique identifier information further comprises data related to contents of said payload.

16. The method as hi claim 8, wherein said cooperative navigation enables delivery of said payload by said autonomous delivery vehicle safely when said desired location is a safe location.

17. The method as in claim 8, wherein said unique identifier is generated in electronic form by said third party system against receipt of said geophysical location information and information on details of said payload entered to a computing device manually by said user and said third party system sends said unique identifier in electronic form to said user.

18. The method as in claim 8, wherein said autonomous delivery vehicle collects an acknowledgement against successful delivery of said payload from said desired location.

19. The method as in claim 18, wherein said acknowledgement is an electronic code included in said unique identifier information.

20. The method as in claim 18, wherein said acknowledgement is a physical receipt provided at said desired location.

21. A system for delivery of a payload by an autonomous delivery vehicle, said system comprising:
a unique identifier having a unique identity, wherein said unique identifier is a target unique identifier placed at a location where delivery of said payload is desired by a user and said unique identifier is a machine readable code recognizable in any frequency that lies within a visible frequency range, an infrared frequency range or an ultra violet frequency range of an electromagnetic spectrum;
a mobile computing device configured to collect a unique identifier information and to communicate said unique identifier information with a third party system, said unique identifier information comprising said unique identity of said unique identifier and a geophysical location information for said location;
a navigation system included in said autonomous delivery vehicle, said navigator system comprising a first prior art navigator and a second scanner navigator, wherein said navigation system is provided with said unique identifier information by said third party system;
wherein said first prior art navigator navigates said autonomous delivery vehicle to said location based on said geophysical location information and said second scanner navigator scans said location, locates said target unique identifier based on said unique identity and then navigates said autonomous delivery vehicle precisely to said unique identifier for delivery of said payload.

22. The system as in claim 21, wherein said unique identifier is generated by said third party system.

23. The system as in claim 21, wherein said unique identifier is generated by said user using common manufacturing methods.

24. The system as in claim 21, wherein said mobile computing device is provided with a detachable electronic device configured to add additional capability of scanning and transmission to said mobile computing device.

* * * * *